July 8, 1958

R. L. ROCKEFELLER ET AL 2,841,981

AUTOMATIC VERIFICATION OF ZEROS

Filed May 7, 1956

INVENTORS
ROBERT L. ROCKEFELLER
BY LEON F. TRIMBLE

*Joe L. Koerber*

ATTORNEY

July 8, 1958    R. L. ROCKEFELLER ET AL    2,841,981
AUTOMATIC VERIFICATION OF ZEROS Filed May 7, 1956    6 Sheets-Sheet 3

R. L. ROCKEFELLER ET AL 2,841,981

AUTOMATIC VERIFICATION OF ZEROS

Filed May 7, 1956

United States Patent Office 2,841,981
Patented July 8, 1958

2,841,981
AUTOMATIC VERIFICATION OF ZEROS

Robert L. Rockefeller, Red Hook, and Leon F. Trimble, Hyde Park, N. Y., assignors to International Business Machines Corporation, New York, N. Y., a corporation of New York Application May 7, 1956, Serial No. 583,313

15 Claims. (Cl. 73—156)

This invention relates to a punched record verifying machine and more particularly to a machine in which records provided with punched columns of data are checked or verified for correctness of punching under control of a manual keyboard.

Verifying machines, in general, are well known in the art and the subject invention is directed to improving such machines by increasing the output per machine and by reducing the effort required by the operator.

The principal object of this invention is to provide controls to cause the machine to automatically verify a plurality of successive identical digits.

A further object of this invention is to provide controls to cause the machine to automatically verify all zeros to the left of a significant digit in a so-called "field" comprising a plurality of columns.

Another object of this invention is to provide controls for automatically verifying a plurality of consecutive zeros by the operation of a single key.

A further object of this invention is to provide controls for automatically verifying a plurality of consecutive zeros in a recording field by the operation of a single key corresponding to the number of significant digits in the field.

Other objects of the invention will be pointed out in the following description and claims and illustrated in the accompanying drawings, which disclose, by way of example, the principle of the invention and the best mode, which has been contemplated, of applying that principle.

The machine to which the invention is applied in this preferred embodiment is the well-known "IBM" Card Verifier, which is shown and described in detail in Patent No. 2,615,333, issued October 28, 1952, to E. W. Gardinor et al.

Only so much of the machine is shown and described hereinafter as is necessary for an understanding of the invention.

The cards handled by the "IBM" Card Verifier are the well-known eighty-column cards having twelve index positions per column. One or more index positions in a column are punched to represent alphabetic, numeric and special characters. Groups of columns are designated as fields in which particular data are recorded. The data recorded in, for example, a seven column field does not necessarily occupy all seven columns. For example, such numbers as 275314, 267 or 3 may be recorded in a field. For reasons not pertinent here, it is desirable that all columns of the field contain data and the columns to the left of the highest order significant digit are punched with zeros; for example, 0275314, 0000267 or 0000003. If a smaller field for example, four columns is desired, the program card may be altered to permit this, for example 0032.

In this Verifier a punched card is caused to be fed from a feed hopper and registered at a verifier station comprising a row of verifier pins, one for each index position of the card column. Data which are supposedly punched in the record card are keyed on a keyboard as the card is advanced, column by column, past the verifier station. As each key is actuated corresponding elements associated with the verifier pins are actuated and all verifier pins are raised. If a verifier pin, corresponding to each actuated element, senses a hole in the card, normal circuits are maintained; however, if there is not agreement between the actuated elements and the verifier pins which sense holes, the normal circuits are altered to indicate the error which may be due to an erroneous hole in the card or erroneous operation of the keys.

In accordance with the hereinbefore recited objects, it is desired to effect, by a single key operation, the verifying of a particular digit in a number of consecutive columns of the card wherein the number is determined by the particular key which is operated. As described herein, it is desired to verify pluralities of zeros; however, in other applications it may be desirable to verify pluralities of other characters. Such verification may be accomplished within the scope of this invention.

Figure 1:
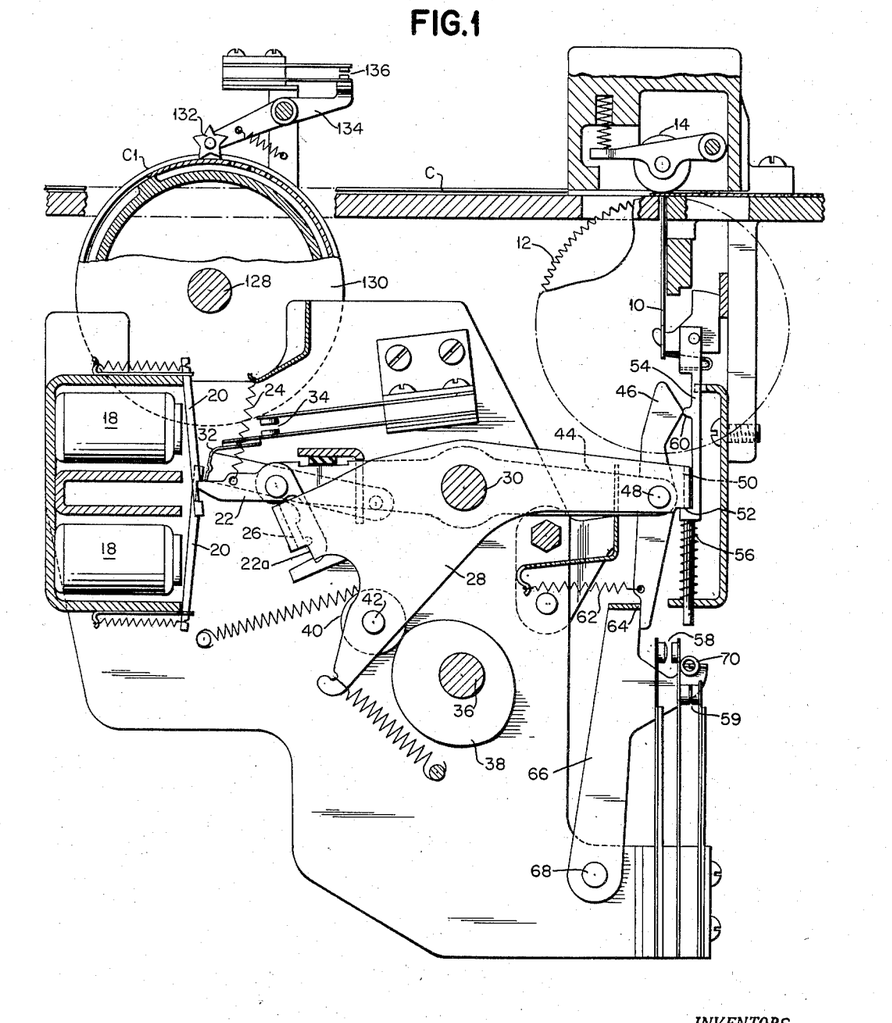
Fig. 1 is a side elevation of a record verifying mechanism.
Figures 3, 4:
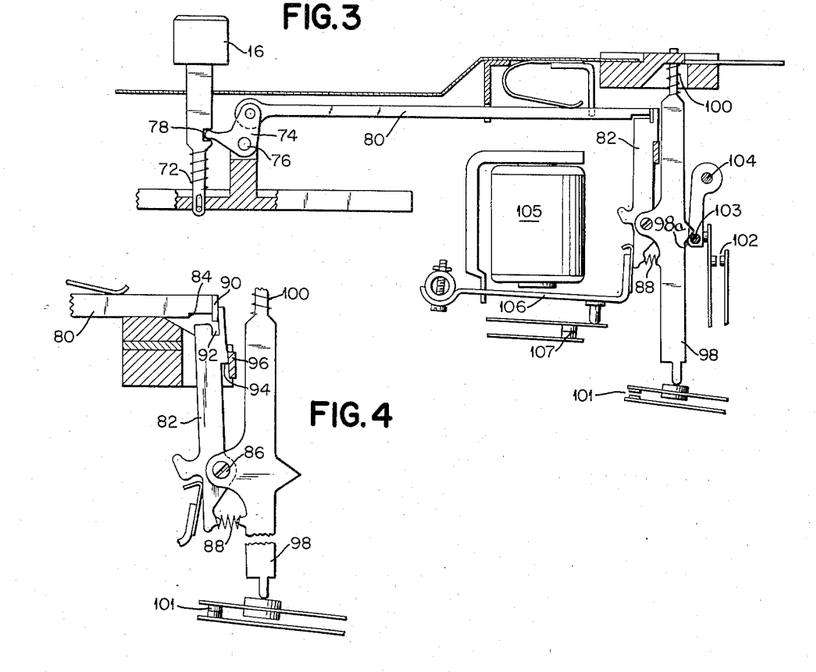
Fig. 3 is a view of a keying mechanism.
Fig. 4 is a partial view of the mechanism of Fig. 3.

Referring to Fig. 1, twelve pairs of sensing pins 10, one pair for each index position of a card column, are arranged as a verifying station and are raised during each machine cycle to sense a card C, as it is advanced past the verifying station by a serrated card feed roller 12 in cooperation with a pressure roller 14. Each time a key 16, of the type shown in Fig. 3, is actuated, a corresponding interposer magnet 18, Fig. 1, is energized to attract its armature 20. The interposer magnets are arranged in an upper row and a lower row to conserve space. When an armature 20 is attracted, it releases a corresponding interposer 22 which is biased in a clockwise direction by a spring 24. The interposer 22 rotates in a clockwise direction to move a hooked end 22a under a bail 26 which is mounted on two arms 28 pivoted on a shaft 30. The actuated interposer 22, through a bail 32, also closes contacts 34 to initiate a machine cycle by completing a circuit from line 140, Fig. 7a, through contacts 38 and R4b normal, to the control grid of tube T7, which conducts and energizes the Verify Magnet 124. During the machine cycle thus initiated, a shaft 36 mounting a cam 38 rotates and, through a cam follower 40 pivoted at 42 on the arm 28, swings the bail 26 in a counterclockwise direction and, through an actuated interposer 22 mounted on the arm 44, pivots the arm 44 in a counterclockwise direction about the shaft 30 thereby raising a finger 46 which is pivoted at 48 on the arm 44.

A bail 50 is mounted on the right-hand end of the arms 28, and cooperates with offset portions 52 of elements 54 to hold the elements 54 in a downward position, as shown in Fig. 1, against the pressure of springs 56. An element 54 is provided for each index position and each element 54 mounts a pair of the sensing pins 10. During the machine cycle, all elements 54 are released and are moved upwardly by their springs 56 whereby the twelve pairs of sensing pins 10 analyze the twelve index positions of a card column registered at the verifying station. At the index positions which do not contain holes, the pins 10 and elements 54 are arrested by contact with the card.

At the index positions which do contain holes, the pins 10 and elements 54 rise to the limit of their movement with the pins 10 passing through the holes.

If elements 46 are actuated through key operations to correspond to holes sensed by the pins 10, the machine indicates that the data in the particular column is verified as being correct. If the data is verified as correct, contacts 58 remain open and contacts 59 remain closed. If the data is not verified, that is, if there is not agreement between the sensed hole and the actuated key 16, the contacts 58 are closed to energize circuits for indicating the error and the contacts 59 open to interrupt other circuits.

The contacts 58 and 59 are controlled as follows: If a particular pair of pins 10 sense a hole and a corresponding finger 46 has been actuated through key operation, the finger 46 and the corresponding element 54 rise together and the finger 46 remains in contact with a stud 60 on the element 54; the contacts 58 remain open and the contacts 59 remain closed. If a finger 46 is actuated and the corresponding pins 10 do not sense a hole, the pins 10 and element 54 are arrested in a lower position while the finger 46 rises, whereby the finger 46 disengages the stud 60 and is rotated in a clockwise direction about its pivot 48 by a spring 62. The lower end of the finger 46 engages a bail 64 mounted on arms 66 (one shown) and pivoted at 68. The arms 66 are rotated in a counterclockwise direction and a roller 70, mounted on one of the arms 66, closes the contacts 58 to set up the error indicating circuits and opens the contacts 59 to interrupt circuits which indicate that the correct data has been punched and verified as correct. If particular pins 10 sense a hole and the corresponding finger 46 has not been actuated, the element 54 rises whereas the finger 46 remains in its lower position. Again the finger 46 disengages the stud 60 and the contacts 58 and 59 are actuated as before.

Referring to Figs. 3 and 4, one of a plurality of keying mechanisms is shown. When a key 16 is manually depressed against a spring 72, a bell crank 74, pivoted at 76 and engaging a notch 78 in the stem of the key 16, is rotated in a counterclockwise direction and, through a link 80 actuates an element 82. Referring to Fig. 4, a notch 84 in the link 80 normally prevents counterclockwise movement about a pivot 86 of the element 82 which, additionally, is biased clockwise by a spring 88. A flange 90 on the link 80 engages a notch 92 in the element 82. Through the flange 90 and notch 92, the element 82 is rocked counterclockwise when the link is actuated. When the element 82 is so rocked, a shoulder 94 disengages a retaining bar 96 whereby a finger 98 mounting the element 82 and biased downwardly by a spring 100 is released for downward movement to close a pair of contacts 101 whereby a corresponding interposer magnet 18, Fig. 1, is energized, in the manner described in the hereinbefore cited patent and keyboard bail contacts 102 are closed through a shoulder 98a of the element 98 swinging a bail 103 about its pivot 104.

At a suitable time thereafter, the contacts 101 are opened by energizing a Keyboard Restore Magnet 105 which, through its armature 106, raises the elements 82 and 98 to relatch them in normal position. A pair of contacts 107 also are opened by the armature 106 for a purpose described hereinafter.

Figure 2:
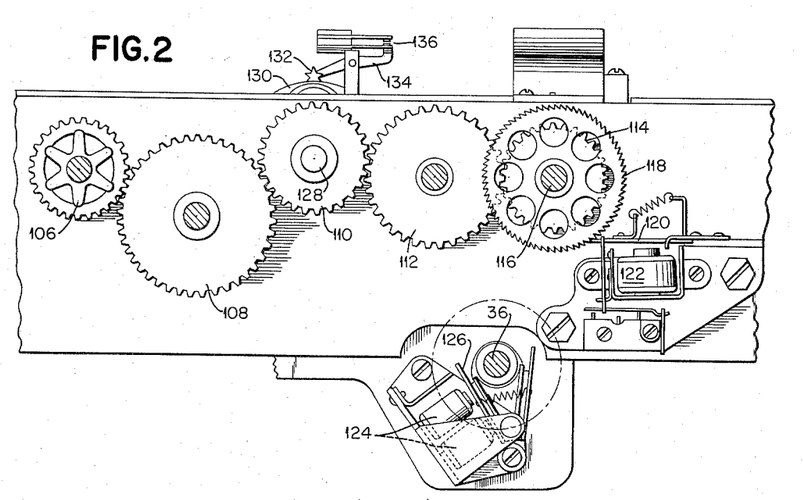
Fig. 2 is a side elevation of an escapement mechanism.

Referring to Fig. 2, the escapment mechanism is shown. Power is constantly applied to a friction clutch 106 and through gears 108, 110, 112 and 114, to a shaft 116. In addition to the gear 114, the shaft 116 mounts a ratchet wheel 118 and the card feed wheel 12 shown in Fig. 1. When an escape armature 120 of an Escape Magnet 122 is withdrawn from the teeth of the escape wheel 118, power is transmitted through the friction clutch 106 and the gear train to the shaft 116 whereby the shaft is rotated and the card C is advanced. A one column advance of the card is obtained by permitting a single tooth of the escape wheel 118 to pass the armature 120. More extensive advances of the card are accomplished by holding the magnet 122 energized for a longer period of time.

The machine cycle referred to hereinbefore as initiated by closing the contacts 34, occurs as follows: The contacts 34 complete circuits to energize a pair of magnets 124, Fig. 2, to actuate an armature 126 whereby a clutch (not shown) is engaged to effect a rotation of the shaft 36.

A shaft 128, mounting the gear 110 in Fig. 2, also mounts a program drum 130. The program drum mounts a program card $C_1$, shown in Fig. 5, similar to the card C, which it advances concurrently with the movement of a card C through the verifying station. Star wheels 132 mounted on arms 134, sense perforations in the program card $C_1$, in a well-known manner, and close contacts 136 each time a hole is sensed.

Program card

Figure 5:
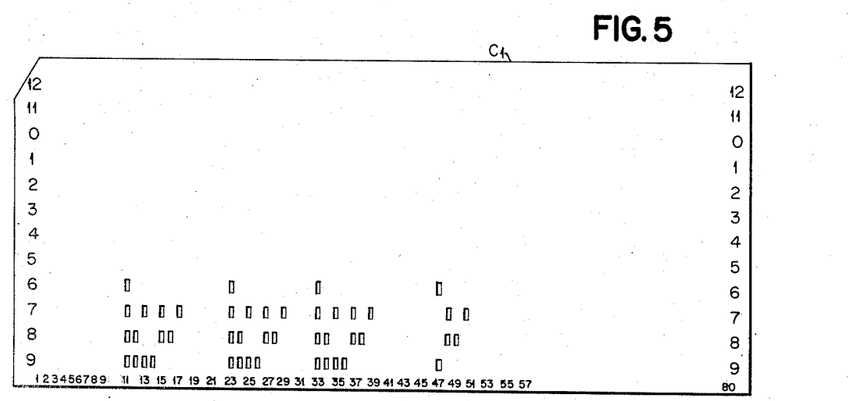
Fig. 5 is a program card.

Referring to Fig. 5, the program card $C_1$ is shown as prepared for use in the subject invention. Columns #11–#17, #23–#29 and #33–#39, comprise seven column fields and columns #47–#50 comprise a four column field. The number of columns in a field determine the maximum number of digits which may be recorded therein and also the maximum number of zeroes which may be automatically verified. The size of the field may be varied according to the needs of the operator.

In the example described hereinafter, the procedure for verifying the numbers 0275413, 0000267, 0000003, and 0032 is outlined and the program card $C_1$ in Fig. 5, is prepared accordingly.

Figure 6:
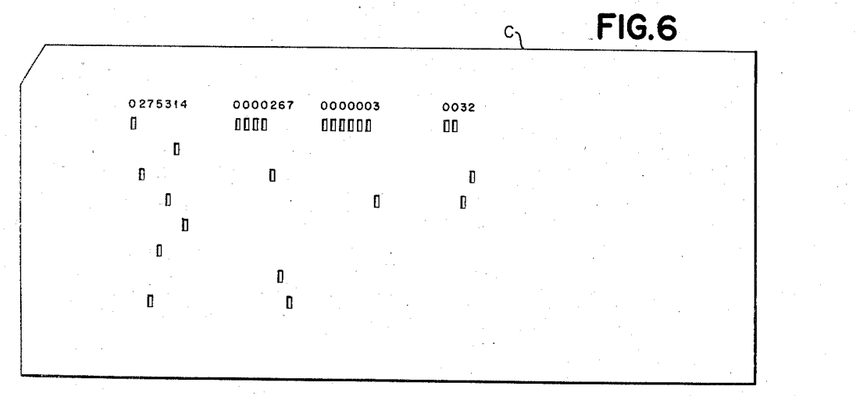
Fig. 6 is a record card containing punched data.

Referring to Fig. 6, a card C is shown punched with the above numbers in the four fields already described.

Circuits

Figures 7, 7A:
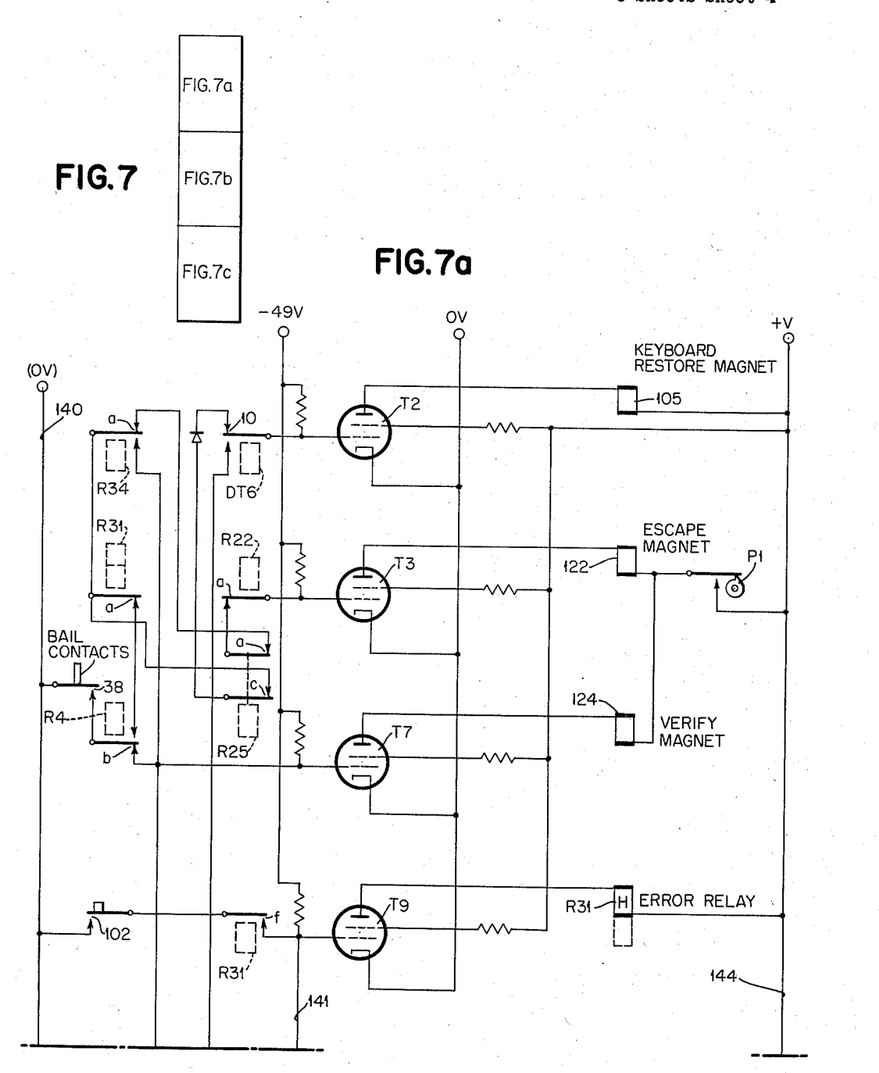
Fig. 7 illustrates the proper arrangement of Figs. 7a, 7b and 7c.
Figs. 7a, 7b and 7c comprise a partial wiring schematic of a verifying machine.
Figure 7B:
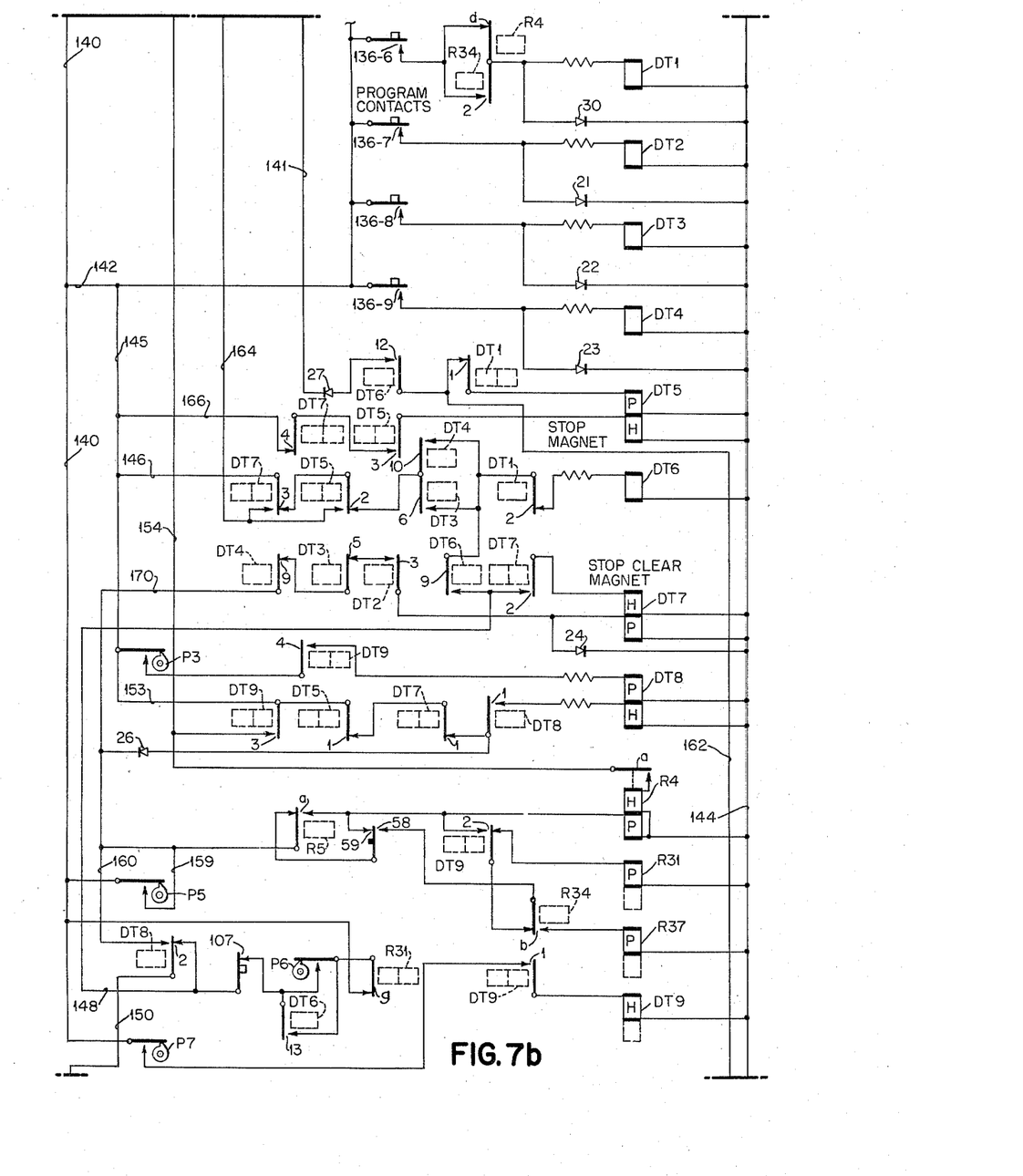
Figure 7C:
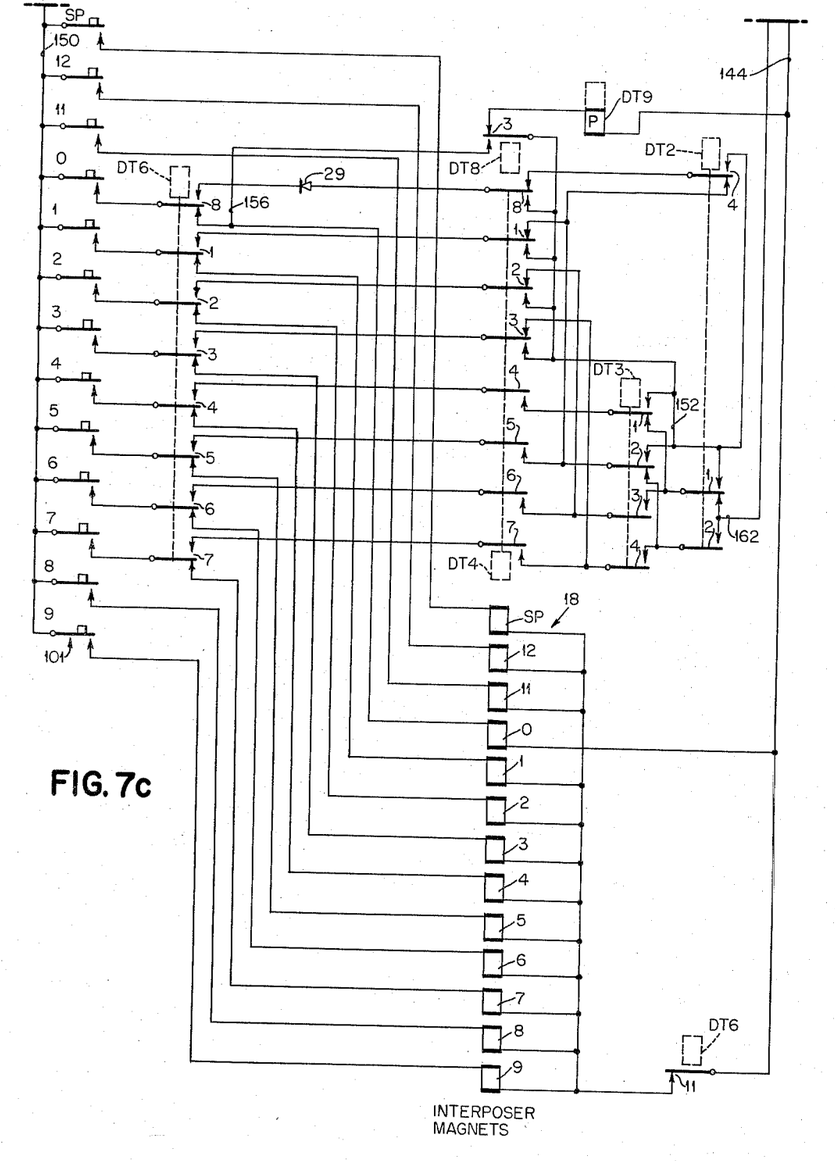

Fig. 1 shows the proper arrangement of Figs. 7a, 7b, and 7c to form the wiring schematic. Most of the circuit for the machine is the same as for the machine described in Patent 2,615,333. Only a portion of that circuit is shown in the accompanying figures and additional relays and relay points required for the Decimal Tabulation (DT) functions are identified by a prefix DT.

Referring to Fig. 7a, four tubes T2, T3, T7 and T9 of the usual "Verifier" circuit are shown. The tubes are connected as described in the hereinbefore cited patent and are normally biased below cut off by a minus 49 volt potential on their respective first grids. When the first grid of a tube is connected to a zero potential line 140, the tube conducts and energizes a relay or electromagnet in its plate circuit.

The plate circuit of tube T2 includes the Keyboard Restore Magnet 105, shown in Fig. 3, which, when energized, relatches any actuated elements 82 and 98 as described hereinbefore.

The plate circuit of tube T3 includes the Escape Magnet 122, shown in Fig. 2, which, when energized, effects the advancing of a card C in the verifying station and the concurrent advance of the program drum 130 and program card $C_1$.

The plate circuit of tube T7 includes the Verify Magnet 124, shown in Fig. 2, which, when energized, effects a machine cycle during which the sensing pins 10 are raised to sense index positions of a card column at the verify station.

The plate circuit of tube T9 includes the hold coil of an Error Relay R31. When an error is indicated by the closing of contacts 58 and the opening of contacts 59, the relay R31 is energized through circuits to be described and, through contacts R31f of the Relay R31, the tube T9 is caused to conduct and energize the hold relay R31H in the plate circuit thereof. Through a line 141 and contacts DT6-12 and DT1-1, Stop relay DT5 is energized to stop the automatic verifying.

Referring to Fig. 7c, the usual keyboard contacts 101—0, 101—1, 101—2, 101—3, 101—4, 101—5, 101—6, 101—7, 101—8, 101—9, 101—11, 101—12, and 101—SP (Space) are shown. Also shown are corresponding interposer magnets 18 which are further designated 0—9, 11, 12 and SP similar to the designation of the keyboard contacts 101.

Referring to Fig. 7b, four of the star wheel contacts 136 are shown which are associated with index positions 6, 7, 8, and 9 of the program drum 130 for sensing the Decimal Tab program holes shown in the card $C_1$, Fig. 5. When the contacts 136—6, 136—7, 136—8 and 136—9 are actuated, respective relays DT1, DT2, DT3, and DT4 are energized to set up the automatic Decimal Tabulation (DT) circuits.

Assume that the machine is in operation and the card C, shown in Fig. 6 is registered with its column #1 at the verify station. The card C may be advanced, for example, by successively closing the contacts 101—SP by operating the Space Key and energizing the Space Magnet 18—SP to effect spacing in the manner described in the hereinbefore described patent. When column #10 of the card C is at the verifying station, column #11 of the program card, shown in Fig. 5, is under the star wheels 132. Since the field comprising columns #11–#17 is a seven column field, the high order column of the program card, column #11, is coded 7, 8, 9; column #12 is coded 8, 9; column #13 is coded 7, 9; column #14 is coded 9, column #15 is coded 7, 8; column #16 is coded 8; and column #17 is coded 7. It will be noted that the highest order column of each field also is coded 6. The 6 code is required, in the event an error occurs in the column of the card C, preceding the Decimal Tabulation field, in this example, column #10. If an error occurs in column #10, contacts DT1—1, Fig. 7b, being open, prevent energizing DT5, which would drop out the Decimal Tab circuits set up by energizing one or more of the relays DT2, DT3 and DT4. Contacts DT1—2, Fig. 7b, being open, prevent energizing the Keyboard Disconnect relay DT6. If the data in the column preceding the DT field is verified as correct, the relay R4 is energized in the usual manner and contacts 4d, Fig. 7b, in the #6 program circuit open to deenergize DT6 so the DT operation may proceed. If an error does occur in that column, the contacts 34h close, in parallel with contacts 4d, to maintain the circuit for relay DT6 to inhibit the DT operation.

With the machine in operation, a circuit is complete from the zero volt line 140, through a line 142 and through any closed contacts 136 and associated DT relays to a plus potential line 144. In the first example, all relays DT2, DT3 and DT4 are energized according to the program card coding 7, 8 and 9 in column #11. Relay DT1 is not energized since the preceding column was verified as correct. A circuit is completed from line 140, through lines 142 and 145, 146, contacts DT7—3 normal, DT5—2 normal, DT3—6 and DT4—10 transferred, in parallel, contacts DT1—2 normal and the coil of relay DT6 to the line 144. Relay DT6 is the Keyboard Disconnect relay. The contacts 1 through 12 of DT6 transfer. Referring to Fig. 7c, contacts DT6—1 through DT6—8 disconnect the key contacts 101 from the interposer magnets 18 and connect the contacts instead of a Decimal Tab (DT) analyzing network. Contacts DT6—11, Fig. 7c, disconnect all interposer magnets except 18—0 from the line 144. When the program card has advanced to the units column of a field, a hold circuit is provided for relay DT6 as follows: From the line 140, through contacts R31g, contacts DT6—13 shunting contacts P6, 107, line 148, contacts DT6—9 transferred, DT1—2 and relay DT6 to the line 144. In the units column relays DT3 and DT4 are not energized and contacts DT4—10 and DT3—6 are open thereby breaking the usual circuit to DT6. The contacts DT6—10, normal, Fig. 7a, open the normal circuits to the Keyboard Restore Magnet 105 to prevent restoring the keyboard contacts 101 when the high order column and successive columns of the field are automatically verified for zero designations. The transfer contacts DT6—10 complete a circuit for restoring the keyboard contacts after the designated number of zero verifying cycles has been completed. Contacts DT6—12, Fig. 7b, complete a circuit to energize a Stop relay DT5, as described hereinbefore, when an error is made during a Decimal Tab operation at which time a circuit is completed from the line 140, through the keyboard bail contacts 102, Fig. 7a, contacts R31f transferred, line 141, rectifier 27, contacts DT6—12 transferred, DT1—1 normal and the relay DT5 to the line 144.

*Example #1*

In the first example, the number 0275314 is to be verified. The number contains six significant digits so the key 16—6, indicating six significant digits, is depressed to close corresponding contacts 101—6 and complete a circuit from the line 140, through contacts R31g, P6 and DT6—13 in parallel, 107, DT8—2 normal, line 150, contacts 101—6, contacts DT6—6 transferred, contacts DT4—6 transferred, DT3—3 transferred, DT2—1 transferred, a line 152, contacts DT8—3 normal, and through the pick coil of a relay DT9 to the line 144.

Figure 8:
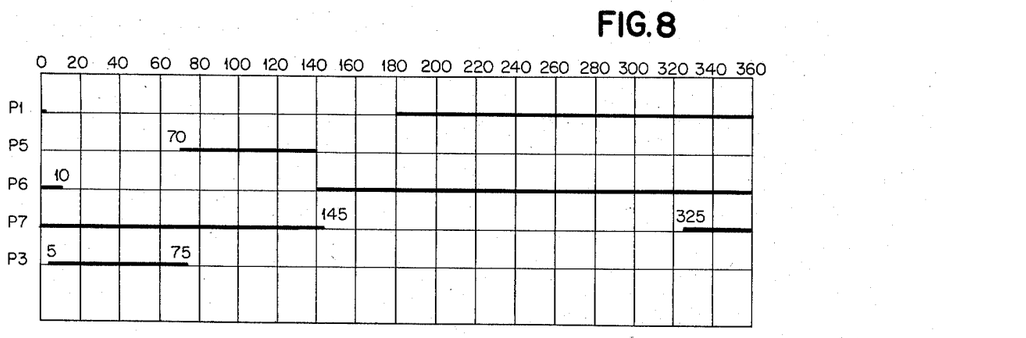
Fig. 8 is a timing chart.

Contacts DT9—1, Fig. 7b, close completing a circuit to the DT9 hold coil as follows: From line 140 through contacts P7, DT9—1 transferred, and the DT9 hold coil to the line 144. A cycle of the vertifier clutch 124 is initiated by a circuit from the line 140, through lines 142, 145, 153, contacts DT9—3 transferred and a line 154 to the first grid of tube T7 thereby causing T7 to conduct and energize the magnet 124 thereby initiating a cycle of the shaft 36 to operate the various P cam contacts and to advance the card C one column space and raise the sensing pins 10. The relative operating times of the P cam contacts is illustrated in Fig. 8. The pins 10 sense a zero hole in column #11. The contacts P3 close at five degrees of the cam cycle completing a circuit from the line 140, through lines 142 and 145, the contacts P3, DT9—4 transferred and a relay DT8 to the line 144. Relay DT8 transfers its contacts DT8—2, Fig. 7b, breaking the previously traced circuit to the relay DT9 and completing a circuit, at P5 time (seventy degrees of the cam cycle) from the line 140, through contacts P5, lines 159 and 160, contacts DT8—2 transferred, to the line 150, through contacts 101—6, DT4—6 transferred, DT3—3 transferred, DT2—1 transferred, line 152, contacts DT8—3 transferred, and line 156, through the interposer magnet 18—0 to the line 144. The energized interposer magnet 18—0 and the hole sensed by the pins 10 are in agreement so the contacts 58 and 59 remain normal as described hereinbefore.

Contacts DT8—1, Fig. 7b, provide a hold circuit for relay DT8 from the line 140, through the lines 142, 145, 153, contacts DT5—1 normal, DT7—1 normal, DT8—1 transferred, and the hold coil of relay DT8, to the line 144. A parallel hold circuit extends from line 140, contacts P5, lines 159 and 160, rectifier 26, contacts DT8—1 to relay DT8 (hold) and the line 144.

The number of zeros to be automatically verified in Example #1 is one; therefore when the card C was advanced one column space for the sensing of column #11, the program card $C_1$ advanced to column #12 where the code holes 8 and 9 were read. Relays DT3 and DT4 were accordingly energized. A circuit is completed from line 140, through contacts P5, lines 159 and 160, contacts DT8—2 transferred, line 150, contacts 101—6, DT6—6 transferred, DT4—6 transferred, DT3—3 transferred, DT2—1 normal, a line 162, contacts DT1—1, Fig. 7b, and Stop relay DT5 to the line 144. Relay DT5 transfers its contacts DT5—2, Fig. 7b, opening the circuit to relay DT6 and completing a circuit to the Keyboard Restore Magnet 105 as follows: From line 140, through lines 142, 145, 146, contacts DT7—3 normal, DT5—2 transferred, a line 164, contacts DT6—10 transferred, to the first grid of tube T2 which conducts and energizes the Keyboard Restore Magnet 105. The Keyboard Restore Bail contacts 107 open breaking the P6 pulse through the line 148, Fig. 7b, contacts DT6—9, contacts DT1—2 and the Keyboard Disconnect relay DT6. Contacts DT5—3 provide a hold circuit for DT5 from line 140 through lines 145 and 166, contacts DT7—4 normal, DT5—3 transferred and the DT5 hold coil to the line 144. Contacts DT5—1 open to deenergize relay DT8 and return the DT8 contacts to normal.

With automatic verifying thus halted, the significant digits 275314 may be keyed and verified in the usual manner.

When the program card is positioned at the units column of the card field and only relay DT2 is energized, relay DT7 is energized, when the P5 contacts make, to clear all DT circuits and return all circuits to their normal condition. The DT7 circuit is from the line 140, through contacts P5, line 159, line 170, contacts DT4—9 normal, DT3—5 normal, DT2—3 transferred and the pick coil of relay DT7 to the line 144. A hold circuit is provided from line 140 through contacts R31g, P6 and DT6—13 in parallel, 107, line 148, contacts DT7—2 and the hold coil of relay DT7 to the line 144. When the keyboard is restored, contacts 107 open and the hold circuit is interrupted. Contacts DT7—4 break the hold circuit to the Stop relay DT5.

*Example #2*

The number to be vertified is 0000267. Again a seven column field, comprising columns #23–#29, is used and four zeros are required to fill the field. When the program card column #23 is aligned at its read station, the relays DT2, DT3 and DT4 are energized as before. The key 101—3, representing three significant digits, is operated and the verify cycle is initiated in the manner described in Example #1, except that relay DT9 is energized by a circuit from line 140 to line 150 as before, through contacts 101—3, DT6—3 transferred, DT4—3 transferred and DT8—3 normal, to the relay DT9 and the line 144. The interposer magnet 18—0 is then energized as follows: From line 140 to line 150 as before, through contacts 101—3, DT6—3 transferred, DT4—3 transferred, DT8—3 transferred, line 156 and magnet 18—0 to the line 144.

The circuit to the zero interposer magnet is identical for columns #23, #24, #25 and #26 since the relay DT4 is energized in each of those columns.

When column #27 of the program card C₁ is sensed, relays DT2 and DT3 are energized in accordance with the program code 7, 8. The Stop circuit is completed as follows: From line 140 to line 150 as before, through contacts 101—3, DT6—3 transferred, DT4—3 normal, DT3—4 transferred, DT2—2 transferred, line 162, contacts DT1—1 and through the Stop relay DT5 to the line 144. As described hereinbefore, the energizing of relay DT5 stops the automatic verification of zeros and the manual keying of significant digits may be performed. In the units column of the field, the Stop Clear relay DT7 is again energized to clear all DT circuits.

*Example #3*

The number to be verified is 0000003 and the seven column field comprises columns #33–#39. At column #33, the relays DT2, DT3 and DT4 are energized as before and the key 101–1, representing one significant digit, is operated. The verify cycle is initiated in the now familiar manner except that the circuit for the relay DT9 is as follows: From the line 140 to line 150 as before, through contacts 101—1, DT6—1 transferred, DT4—1 transferred, DT8—3 normal, relay DT9 and the line 144. In columns #33, #34, #35 and #36, the zero interposer magnet circuit is from the line 140 to line 150 as before, through contacts 101—1, DT6—1 transferred, DT4—1 transferred, DT8—3 transferred and line 156 to the magnet 18—0 and the line 144.

In columns #37 and #38, DT4 is not energized. The code in column #37 is 7, 8; therefore, relays DT2 and DT3 are energized. The circuit is from line 140 to line 150, as before, through contacts 101—1, DT6—1 transferred, DT4—1 normal, DT3—2 transferred, line 152, contacts DT8—3 transferred and line 156 to magnet 18—0 and line 144. The code in column #38 is 8; therefore, relay DT3 is energized. The circuit is identical to the circuit for column #37. When column #39 is reached it is desired to energize the Stop relay DT5. The code in column #39 is 7 and relay DT2 is energized. The circuit is from the line 140 to the line 150 as before, through contacts 101—1, DT6—1 transferred, DT4—1 normal, DT3—2 normal, DT2—2 transferred, to line 162 and through relay DT5 to line 144. At column #40, the Stop Clear relay DT7 is energized as described in Example #1 to restore all circuits to normal.

*Example #4*

Columns #47–#50 comprise a four column field. The code is identical to the code for the four lowest order columns of the seven column field. The code 6 appears in the highest order column of the field, Fig. 5, to energize relay DT1 as described hereinbefore. The operation for the four column field is similar to that for the seven column field.

*Example #5*

If there are no significant digits in a field and the field is punched with zeros, the seven zeros (assuming a seven column field) may be automatically verified. In the first column of the field the relays DT2, DT3, and DT4 are energized in the usual manner. The relay DT9 is energized as follows to initiate a verify cycle: From line 140 to line 150 as described, through contacts 101—0, representing the total absence of significant digits, through DT6—8 transferred, rectifier 29, contacts DT4—8 transferred, DT8—3 normal to relay DT9 and the line 144. The seven successive zero verification circuits are as follows:

(1) From line 140 to line 150 as before, through contacts 101—0, DT6—8 transferred, rectifier 29, contacts DT4—8 transferred, DT8—3 transferred, line 156, magnet 18—0, line 144.
(2) Same as (1).
(3) Same as (1).
(4) Same as (1).
(5) Line 140 to line 150, contacts 101—0, DT6—8 transferred, rectifier 29, contacts DT4—8 normal, DT2—4 transferred, line 152, contacts DT8—3 transferred, line 156, magnet 18—0, line 144.
(6) Line 140 to line 150, contacts 101—0, DT6—8 transferred, rectifier 29, DT4—8 normal, DT2—4 normal, DT3—2 transferred, line 152, DT8—3 transferred, line 156, magnet 18—0 and line 144.
(7) Same as (5).

As the tens column of the record card field advances to the sensing pins 10, the units column of the program card advances to the star wheels and the code 7 is read. Relays DT3 and DT4 are now deenergized and relay DT2 is energized. The verification is accomplished as described above for step 7. The hold circuit to the relay DT6 through the parallel contacts DT3—6 and DT4—10 is broken. However, a hold circuit is provided, as described in Example #1 from line 140, through contacts R31g, P6 and DT6—13 in parallel, 107, line 148, contacts DT6—9 transferred and DT1—2 normal, to the relay DT6 and the line 144.

As the units column of the record card field advances to the sensing pin 10, the column simultaneously advanced to the star wheels is outside the program field and none of the relays DT2, DT3, or DT4 are energized through the star wheel contacts 136. At ten degrees of the P6 cam, the contacts P6 open but are shunted by contacts DT6—13, Fig. 7b, to maintain the DT6 hold circuit. At seventy degrees of the cam cycle the P5 circuit is completed, as described hereinbefore, to the interposer magnet 18—0 for verification of the units position zero. Also, at P5 time, a circuit is completed through the P5 contacts, line 170, contacts DT4—9 normal, DT3—5 normal, DT2—3 transferred and Stop Clear relay DT7 to the line 144 to halt the automatic verification and return the machine circuits to normal.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. In a record verifying machine, a row of record analyzing elements, means for advancing a record past said row of elements column by column, said record having at least one field comprising a predetermined number of columns in which digit representing designations are recorded, a set of digit representing keys, means controlled jointly by an operated one of said digit representing keys and said record analyzing elements for comparing said keyed digit with a recorded digit designation, a program device having controlling data arranged therein in at least one field comprising a number of columns equal to the corresponding said record field and an analyzing circuit controlled jointly by said program device and any of said keys whose digital value is not greater than the number of columns in said field and effective upon a single operation of said key when the first column of said record field is positioned adjacent said elements for causing the zero representing one of said elements to analyze a number of successive columns for zero designations according to the particular key operated.

2. In a record verifying machine, a row of record analyzing elements, means for advancing a record past said row of elements column by column, said record having at least one field comprising a predetermined number of columns in which digit representing designations are recorded, a set of digit representing keys, means controlled jointly by an operated one of said digit representing keys and said record analyzing elements for comparing said keyed digit with a recorded digit designation, a program device having controlling data arranged therein in at least one field comprising a number of columns equal to the corresponding said record field and an analyzing circuit controlled jointly by said program device and any of said keys whose digital value is not greater than the number of columns in said field and effective upon a single operation of said key when the first column of said record field is positioned adjacent said elements for causing the zero representing one of said elements to analyze a number of successive columns for zero designations, said number being equal to the difference between the value of the operated key and the number of columns in the program field.

3. In a record verifying macine, a row of record analyzing elements one for each of the digits; a plurality of keys, one for each of the digits; means for advancing a record column by column past said analyzing elements; means normally controlled by said keys for effecting operation of said analyzing elements for analyzing related digit positions in a column of said record; means effective when said record is in a predetermined position with respect to said analyzing elements for changing the relationship between said keys and said elements for causing each of several of said keys, when operated, to control the zero analyzing element to analyze a number of successive columns of said record according to the particular key operated.

4. In a record verifying machine, a row of record analyzing digit designated elements, means for advancing a columnar record past said elements column by column a set of digit representing keys, means operable by said keys for actuating corresponding ones of said elements for analyzing digit representing designations in at least one multi-column field in said record, a program device having controlling data arranged therein in at least one field corresponding to said record field and comprising a number of columns equal to said multicolumn field, said keys being operated by first actuating a key representing the number of significant digits recorded in said field and then actuating the keys in accordance with said significant digits, and circuit means controlled by said program device in response to said first key actuation for causing column by column analyzing by the zero designated one of said elements of all columns of said field to the left of said significant digits, subsequent actuation of digit keys causing analyzing by digit designated elements according to the keys actuated.

5. In a record verifying machine, analyzing mechanisms, means for advancing a columnar record past said mechanisms to present successive columns of a field comprising a predetermined number of columns for analyzing digit representing markings therein, a set of digit representing keys, a program device, circuit means jointly controlled by said device and said keys when any of several of said keys is operated and when a predetermined card column is at said analyzing mechanisms for effecting the analyzing by a zero designated said analyzing mechanism of a succession of said columns, a different number of columns being analyzed according to the actuation of each of said several keys.

6. In a record verifying machine, record analyzing means, means for advancing a record past said analyzing means to present thereto a series of columns comprising a field for successive analyzing of digit representations therein, a set of digit representing keys, a program device, other analyzing means controlled jointly by said device and by said keys when any one of several of said keys is operated and when a predetermined record column is at said analyzing means for effecting the analyzing for a predetermined designation in a number of successive columns according to the particular key operated.

7. A record verifying machine comprising, in combination, a line of digit representing elements, a line of corresponding verifier elements, means for advancing a record past said line of verifier elements column by column, said record having a field comprising a predetermined number of columns in which digit representing designations are recorded in digit index positions, a control magnet for each of said digit representing elements, a bank of keys, one for each of said magnets and adapted when actuated to impulse said associated magnet to effect an operation of said related digit representing element, means controlled by an actuated digit representing element for causing a corresponding verifier element to analyze a corresponding digit index position, means controlled jointly by said digit representing elements and said verifier elements for indicating agreement between a keyed digit and a recorded digit designation, a program device, and a network controlled by said program device for temporarily disconnecting each of several of said keys from said associated control magnet and connecting them, through said network to a zero digit control magnet when the first column of said field is in position to be operated upon for verifying the presence of zero designations in a number of columns of said field in accordance with the particular key operated.

8. A record verifying machine comprising, in combination, a line of digit representing elements, a line of corresponding verifier elements, a control magnet for each of said digit elements, a key actuated contact for each of said magnets and normally adapted, when closed, to energize said associated magnet to effect an operation of said related digit element, a program device, an analyzing network controlled by said program device, means for advancing a record past said line of verifier elements column by column, said record having a field comprising a predetermined number of columns in which digit representing designations are recorded, means controlled by said analyzing circuit and actuated when the first column of said field is in a position to be analyzed by said verifier elements for temporarily disconnecting each of several of said key contacts from said associated control magnet and interposing a portion of said network between said contacts and the zero digit control magnet, wherein an actuation of any one of said keys effects an operation of said zero digit control magnet a number of times as determined jointly by the analyzing network and a digital value of said key.

9. A record verifying machine comprising, in combination, a line of digit representing elements, a line of corresponding verifier elements, a control magnet for each of said digit elements, a bank of keys, one for each of the digits, a latch type contact associated with said keys and normally latched closed by an actuation of the related key to effect an operation of the corresponding digit magnet, means for normally unlatching each of said latch contacts after a single operation of the related digit element, means for advancing a record past said verifier elements to present the columns of a field successively thereto for verifying of digital designations therein, a program device, means controlled by said program device when the first column of said field is in a position to be verified for temporarily disconnecting each of said key contacts from said associated control magnet and connecting it to the zero digit control magnet, and means controlled jointly by said program means and one of said key contacts when latched closed for delaying the normal operation of said unlatching means for a predetermined interval wherein a corresponding number of operations of the zero digit magnet is effected.

10. In a record verifying machine, analyzing mechanism, means for advancing a record past said analyzing mechanism, said record having a field comprising a predetermined number of columns containing digit designations, a set of digit representing keys, a program device having controlling data arranged therein in a field comprising a number of columns equal to said record field, and an evaluating network rendered operative when the first column of said record field is in an analyzing position and jointly controlled by said program device and any one of said keys having a digital value not greater than the total number of columns in said program field for causing repeated action of the zero representing analyzing mechanism to analyze a number of columns for zero designations beginning at the left of said record field, said number being equal to the difference between the number of columns in said program field and the digital value of said operated key.

11. A record verifying machine comprising, in combination, a row of digit representing elements, a row of corresponding verifier elements, means for advancing a record past said row of verifier elements to present thereto successive columns of a field containing digit designations, a keyboard having a plurality of digit representing keys, one for each of said digit elements and normally adapted when operated to effect an actuation of said related digit element, a program device having controlling data arranged therein in a field comprising a number of columns equal to the columns of said record field, means controlled jointly by said program device and any of said keys whose digital value is not greater than the number of columns in said program field and effective, upon operation of said key when the first column of said record field is in a position to be analyzed, for causing said analyzing elements to analyze for zero designations said first column and a number of subsequent columns equal to the difference in value between the digit value of the operated key and the number of columns in the program field, means for disabling a normal function of said keys during said zero analyzing, and means jointly controlled by said program device and said previously operated key for restoring said normal function of said keys after the last of said number of subsequent columns has been analyzed for a zero designation.

12. A record verifying machine comprising, in combination, a row of digit representing elements, a row of corresponding verifier elements, means for advancing a record past said row of verifier elements to present successive columns of a field thereto in which digit designations are recorded, a bank of keys, one for each of said digit elements, means controlled by each of said keys and adapted to normally effect a single operation of said related digit element for each key operation, means controlled by an actuated digit element for causing a corresponding verifier element to analyze a corresponding index position, a program device, interconnecting means controlled by said program device and adapted to be connected, under certain conditions, between said keys and the operating means of the zero digit element, a relay adapted, when energized, to disconnect said keys from said related digit element operating means and to connect said keys with said interconnecting means, means associated with said program device and rendered operative when the first column of said field is in an analyzing position for energizing said relay, means controlled jointly by said interconnecting means and any of said keys whose digital value is less than the number of columns in said field and effective upon operation of said key, when the first column of the field is in a position to be analyzed, for causing said zero verifying element to analyze, said first column for zero designations and to similarly analyze subsequent columns equal in number to the difference in value between the operated key and the number of columns in the field, and means controlled jointly by said interconnecting means and said previously operated key for deenergizing said relay after the last of said subsequent columns is analyzed for a zero designation.

13. In a record verifying machine, a row of digit representing elements, a row of corresponding verifier elements, a row of sensing devices, means for advancing a record past said row of verifier elements column by column for analyzing thereby, said record having a field comprising a predetermined number of columns containing digit designations, means for concurrently advancing a program record column by column past said line of sense devices to present predetermined control designations thereto, a bank of relays controlled by said sense devices, contacts of said relays being connected in an interconnecting network, a plurality of digit representing keys, one for each of said digit elements, normally adapted to effect a single operation of the related digit element and verifier element for each key operation, means controlled jointly by said interconnecting network and any one of said keys whose digital value is not greater than the number of columns in said column field, and effective when the first column of said field is in position to be analyzed for initiating a repeated actuation of said digit zero verifier element, and a current responsive device connected to said interconnecting network and adapted when energized to stop said repeated actuation of said zero verifier element, a current path being completed to said stop device when the adjustment of contacts of said relays under control of a column of said program card corresponds to the digital value of the key operated.

14. A record verifying machine comprising, a line of digit representing elements, a line of corresponding verifier elements, a line of sense devices, means for advancing a record past said line of verifier elements for analyzing column by column, said record card having a field comprising a predetermined number of columns in which digit designations are recorded, means for concurrently advancing a program record column by column past said line of sense devices to present predetermined control designations thereto, a bank of digit representing keys, and evaluating circuit means controlled jointly by said sensing devices and one of said keys for causing repeated actuation of the zero representing verifier element to analyze for zero designations in a number of columns beginning at the left of said field, equal in number to the difference between the number of columns in said field and the value of said operated key.

15. In a cyclically operable record verifying machine, record advancing means, an escapement mechanism therefor, said record having columns of designation receiving positions, a plurality of digit keys, record sensing means, means effective upon operation of a key for initiating a machine cycle during which said escapement mechanism advances said record to present a next column to said sensing means, further means jointly controlled by said key and said sensing means for comparing said key value with the designation value in the column presented, program means controlled jointly by said program means and a single actuation of one of said keys for initiating a number of said machine cycles, according to the key actuated, during which a predetermined designation receiving position in succeeding columns is sensed and compared.

References Cited in the file of this patent

UNITED STATES PATENTS 2,615,333      Gardinor et al. _________ Oct. 28, 1952